Figure 1:
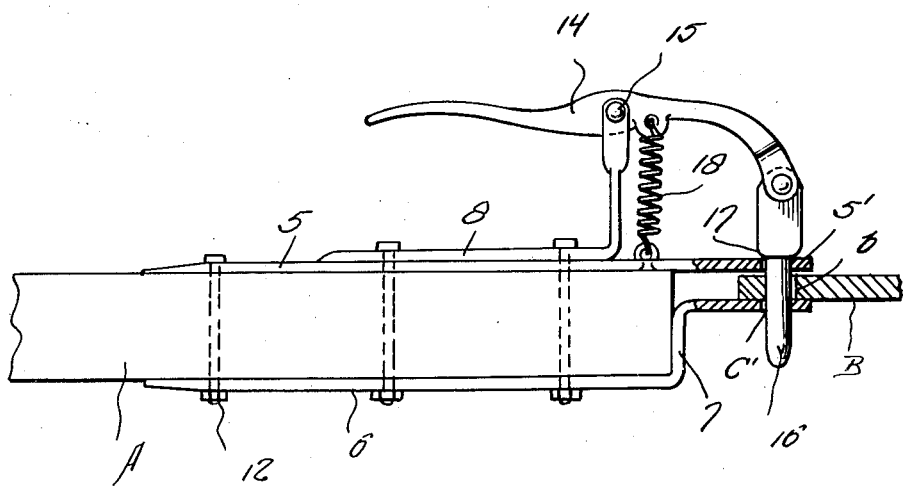

Nov. 20, 1928.

T. W. AUSTIN ET AL 1,692,071

TRAILER HITCH

Filed April 12, 1927

Inventors
T. W. Austin,
M. F. Swindle,

By Clarence A. O'Brien
Attorney

Patented Nov. 20, 1928.

1,692,071

UNITED STATES PATENT OFFICE.

THOMAS W. AUSTIN AND MONROE F. SWINDLE, OF CHANDLER, ARIZONA.

TRAILER HITCH.

Application filed April 12, 1927. Serial No. 183,101.

This invention relates to new and useful improvements in trailer hitches and aims to provide a highly novel, simple, and inexpensive construction associated with the tongue of a trailer so as to facilitate its easy attachment to or removal from a coupling plate upon the rear end of an automobile.

Figure 2:
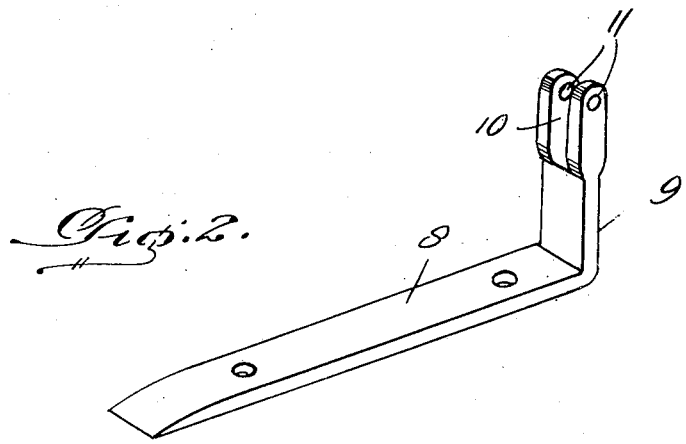

In the accompanying drawing wherein like reference characters indicate corresponding parts throughout the several views:

Figure 1 is an end elevation of a trailer tongue equipped in accordance with the present invention, the coupling pin per se being disclosed as arranged to the opening in a coupling plate disposed upon the rear end of an automobile, and Figure 2 is a perspective view of the pin lever supporting plate, an essential element of the present device.

Now having particular reference to the drawing, A designates the tongue of a conventional trailer, while B designates a coupling plate of any desired construction and rigidly secured to the rear end of an automobile and being formed at its outer end with a pin receiving opening $b$.

In carrying out the present invention, there is disclosed upon the upper and lower sides of the tongue A at the forward end thereof a pair of metallic straps 5 and 6, the ends of which project horizontally in spaced relation beyond the forward end of the tongue, while the lowermost plate 6 is bent upwardly along the forward edge of the tongue as at 7 so that the extreme end thereof will be in slight spaced relation with the end of the uppermost strap 5. As clearly disclosed in Figure 1 the ends of these straps are formed with registering openings 5' and 6', respectively.

Disposed upon the upper strap 5 in a longitudinal manner is a third strap 8, the forward end thereof being provided with a vertical extension 9 bifurcated as at 10, the legs of the bifurcations being provided with registering openings 11—11. The straps 5 and 6 as well as the strap 8 are rigidly bolted to the trailer tongue A by two or more bolts 12, while pivoted within the bifurcated end 10 of the extension 9 of said strap 8 as at 15 is a thumb lever 14, the forward end of which is bent to extend downwardly and to which end is pivotally secured a coupling pin 16, the lower end of which is pointed as clearly indicated in Figure 1 so as to facilitate the proper engagement of the same through the openings $b$ in the straps 5 and 6 as well as the opening in the coupling plate B when said coupling plate is arranged between the spaced ends of said straps. Furthermore the upper end of this pin 16 is of enlarged diameter so as to provide a shoulder 17 to engage the uppermost strap 5 to limit the downward movement of the pin within the openings.

The pin carrying end of the thumb lever 14 is normally held downward through the instrumentality of a retractile coil spring 18, the ends of which are rigidly attached to the strap 5 and to said lever as indicated in Figure 1.

Obviously by reason of a hitch of this character the trailer may be readily coupled with a towing automobile or other vehicle and as readily detached therefrom, and this without requiring the application or removal of any means outside of those associated directly with the trailer and the automobile or towing vehicle.

Having thus described the invention, what we claim is:—

In a hitch for connecting the tongue of a trailer to a coupling plate that extends from the rear end of an automobile, a pair of longitudinally extending metallic straps disposed upon the top and bottom sides of the tongue at the forward end thereof, the outer ends of the straps projecting beyond the forward end of the tongue, the projecting end of the lower strap being bent upwardly for abutting engagement with the forward end of the tongue and then disposed laterally so as to be in slightly spaced parallel relation with respect to the projecting end of the upper strap, the coupling plate being adapted for disposition between the parallel spaced projecting ends of the straps, said ends and the coupling plate being formed with registering openings, an additional strap arranged on the uppermost strap, securing bolts extending through the straps and the tongue, the forward end of the third strap being disposed upwardly and arranged inwardly of the forward end of the tongue, the upper end of said vertical portion of the third strap being bifurcated, a thumb lever pivotally supported intermediate its ends between the furcations, the forward end of the lever being disposed downwardly, a coupling pin adapted for disposition through the registering openings in the straps and coupling plate, the upper portion of the pin being enlarged and pivotally secured to the depending forward end of the lever, and a retractile coil spring secured at one end to the forward end portion of the pivoted lever and at its opposite end to the adjacent portion of the upper strap.

In testimony whereof we affix our signatures.

THOMAS W. AUSTIN.
MONROE F. SWINDLE.